United States Patent
Haller, Jr. et al.

(10) Patent No.: US 9,218,626 B1
(45) Date of Patent: Dec. 22, 2015

(54) AUTOMATIC PREDICTION AND RECOMMENDATION OF PARTS, MATERIALS, AND SERVICES FOR VEHICLE INSURANCE CLAIM ESTIMATES AND SUPPLEMENTS

(71) Applicant: CCC INFORMATION SERVICES INC., Chicago, IL (US)

(72) Inventors: John Laurence Haller, Jr., Kenilworth, IL (US); Brahim Bakayoko, Chicago, IL (US); Kai Li, Chicago, IL (US)

(73) Assignee: CCC INFORMATION SERVICES INC., Chicago, IL (US)

(*) Notice: Subject to any disclaimer, the term of this patent is extended or adjusted under 35 U.S.C. 154(b) by 0 days.

(21) Appl. No.: 14/630,823

(22) Filed: Feb. 25, 2015

(51) Int. Cl.
*G01M 17/00* (2006.01)
*G06Q 40/08* (2012.01)
*G07C 5/08* (2006.01)
*G06Q 10/08* (2012.01)

(52) U.S. Cl.
CPC ............ *G06Q 40/08* (2013.01); *G06Q 10/0875* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 6,470,303 B2 | 10/2002 | Kidd et al. | |
| 7,502,772 B2 | 3/2009 | Kidd et al. | |
| 8,095,391 B2 | 1/2012 | Obora et al. | |
| 8,239,220 B2 | 8/2012 | Kidd et al. | |
| 2013/0325541 A1* | 12/2013 | Capriotti | G06Q 10/20 705/7.21 |
| 2014/0156138 A1* | 6/2014 | Klaff | G06Q 30/0645 701/33.4 |
| 2015/0149218 A1* | 5/2015 | Bayley | G06Q 40/04 705/4 |
| 2015/0213556 A1* | 7/2015 | Haller, Jr. | G06Q 40/08 705/4 |

OTHER PUBLICATIONS

U.S. Appl. No. 12/792,104, "Systems and Methods of Predicting Vehicle Claim Cost", Jun. 2, 2010.
U.S. Appl. No. 14/168,327, "Systems and Metods of Predicting Vehicle Claim Re-Inspections", Jan. 30, 2014.
U.S. Appl. No. 14/168,345, "Systems and Method of Predicting a Vehicle Claim Supplement Between an Insurance Carrier and a Repair Facility", filed Jan. 30, 2014.
U.S. Appl. No. 14/218,148, "System and Method of Predicting Vehicle Claim Information Based on Deformation Images", Mar. 28, 2014.
U.S. Appl. No. 14/218,165, "System and Method of Predicting Vehicle Claim Information Based on Image Attributes", filed Mar. 18, 2014.

* cited by examiner

*Primary Examiner* — Adam Alharbi
(74) *Attorney, Agent, or Firm* — Marshall, Gerstein & Borun LLP

(57) ABSTRACT

A system includes a parts prediction model module. The parts prediction model module causes the system to, based on information obtained via a network interface and indicative of damage to a specific vehicle, filter vehicle parts data to obtain filtered vehicle parts data that is indicative of a subset of a plurality of parts that were utilized to repair a subset of a plurality of vehicles. The parts prediction model module further causes the system to obtain an indication of at least one specific part determined as being needed to repair the damage to the specific vehicle, and analyze the filtered vehicle parts data to determine one or more recommended parts based on the indication. Still further, the parts prediction model module causes an indication of the one or more recommended parts to be transmitted to at least one of a remote computing device or a user interface.

23 Claims, 5 Drawing Sheets

AUTOMATIC PREDICTION AND RECOMMENDATION OF PARTS, MATERIALS, AND SERVICES FOR VEHICLE INSURANCE CLAIM ESTIMATES AND SUPPLEMENTS

CROSS-REFERENCE TO RELATED APPLICATIONS

This application is related to U.S. patent application Ser. No. 14/218,165, entitled "SYSTEM AND METHOD OF PREDICTING VEHICLE CLAIM INFORMATION BASED ON IMAGE ATTRIBUTES" and filed on Mar. 18, 2014, and to U.S. patent application Ser. No. 14/218,148, entitled "SYSTEM AND METHOD OF PREDICTING VEHICLE CLAIM INFORMATION BASED ON DEFORMATION IMAGES" and filed on Mar. 18, 2014, the entire disclosures of which are hereby incorporated by reference herein. This application is also related to U.S. Pat. No. 8,239,220 entitled "METHOD AND APPARATUS FOR OBTAINING PHOTOGRAMMETRIC DATA TO ESTIMATE IMPACT SEVERITY," and to U.S. Pat. No. 8,095,391 entitled "SYSTEM AND METHOD FOR PERFORMING REINSPECTION IN INSURANCE CLAIM PROCESSING," the entire disclosures of which are hereby incorporated by reference herein.

Further, this application is related to U.S. patent application Ser. No. 12/792,104, entitled "SYSTEMS AND METHODS OF PREDICTING VEHICLE CLAIM COST" and filed on Jun. 2, 2010; to U.S. patent application Ser. No. 14/168,345, entitled "SYSTEM AND METHOD OF PREDICTING A VEHICLE CLAIM SUPPLEMENT BETWEEN AN INSURANCE CARRIER AND A REPAIR FACILITY" and filed on Jan. 30, 2014; and to U.S. patent application Ser. No. 14/168,327, entitled "SYSTEMS AND METHODS OF PREDICTING VEHICLE CLAIM RE-INSPECTIONS" and filed on Jan. 30, 2014, the entire disclosures of which are hereby incorporated by reference herein.

FIELD OF THE DISCLOSURE

The present disclosure generally relates to predicting claim information for a vehicle insurance claim, and in particular, to accurately predicting a set of parts that are needed to repair a vehicle, e.g., prior to actually repairing the vehicle.

BACKGROUND

When an insured vehicle is damaged and a vehicle insurance claim is made, typically a representative of the insurance company or carrier (e.g., an adjuster, assessor, or other agent) assesses the damage and generates an estimate of a settlement payment from the insurance company to a repair facility for repairing at least some portion of the damages to the vehicle, e.g., a "settlement estimate" at the insurance company/repair facility interface. This preliminary settlement estimate can include an initial list of parts that are thought of or initially determined as being needed to repair the vehicle. Typically, this initial list is generated by a representative or agent of a repair shop or insurance company/carrier manually generating the list based on his or her own experiences, e.g., by free response and/or by checking off boxes on a pre-populated list or form. This initial list may be provided to or used by a particular repair facility that is to perform the repair work.

In many cases, upon performing its own inspection of the vehicle or upon tearing down the vehicle, the particular repair facility finds additional damage that was not identified in the estimate provided by the insurance carrier, as, for example, the repair facility is able to further access the vehicle and perform a more thorough examination than could an adjuster who generally writes estimates based only on damages he or she can see, discern, or identify first-hand. When damages and/or costs that were not indicated in the estimate are discovered, the repair facility requests an additional monetary amount or a "supplement" from the insurance carrier corresponding to the newly identified damages and/or costs. In particular the repair facility may request additional monetary amounts for additional parts that are required to repair the vehicle, where the additional parts were not included in the initial list of parts provided by the representative of the insurance company.

In some situations, the insurance carrier agrees to the supplement amount straightaway, and in some situations, the insurance carrier negotiates with the repair facility to agree on a set of authorized additional repairs/parts and an amount of the supplement to cover the additional repairs/parts. For some claims, more than one supplement may be requested during the claims resolution process, for example, when still additional damage is uncovered, when replacement parts are difficult to find, and for other reasons. An example description of settlements and supplements of vehicle insurance claims is provided in aforementioned, commonly owned U.S. patent application Ser. No. 14/168,345, entitled "SYSTEM AND METHOD OF PREDICTING A VEHICLE CLAIM SUPPLEMENT BETWEEN AN INSURANCE CARRIER AND A REPAIR FACILITY."

Other monetary amounts or costs may be generated during the vehicle insurance claims resolution process. For example, an estimate and an actual final cost of parts needed to repair the damage to the vehicle may be generated by the claims resolution process, and/or an estimate and an actual final cost of labor to repair the damage to the vehicle may be generated by the claims resolution process. Additionally or alternatively, a final settlement or payout amount to be paid by the insurance carrier to an insured party may be generated or produced by the claims resolution process.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, a system comprises a network interface, one or more data storage devices storing data indicative of a plurality of parts that were utilized to repair a plurality of vehicles, the data indicative of the plurality of parts that were utilized to repair the plurality of vehicles being vehicle parts data, and the vehicle parts data being accessible to a parts prediction model module via the network interface. The parts prediction model module comprises a set of computer-executable instructions stored on one or more memories. The set of computer-executable instructions, when executed by one or more processors, cause the system to, based on information obtained via the network interface and indicative of damage to a specific vehicle, filter the vehicle parts data to obtain filtered vehicle parts data indicative of a subset of the plurality of parts that were utilized to repair a subset of the plurality of vehicles, wherein at least one of: (i) a type of at least some members of the subset of the plurality of vehicles is a type of the specific vehicle, or (ii) at least some of the damage to the specific vehicle is equivalent to respective damage of at least some of the members of the subset of the plurality of vehicles prior to repair. The computer-executable instructions further cause the system to obtain an indication of at least one specific part determined as being needed to repair the damage to the specific vehicle, and analyze, based on the indication of the at least one specific part, the filtered vehicle parts data to determine one or more recommended parts, each of the one or more recommended parts having a respective, higher likelihood of utilization in repairing the specific vehicle than a respective likelihood of utilization in repairing the specific vehicle of at least one other part included in the subset of the plurality of parts and excluded from the one or more recommended parts. Still further, the computer-executable instructions cause the system to cause an indication of the one or more recommended parts to be transmitted to at least one of: a remote computing device via the network interface or a user interface.

In another embodiment, a computer device comprises one or more communication interfaces, an access mechanism to data indicative of a plurality of parts that were utilized to repair a plurality of vehicles, the data indicative of the plurality of parts that were utilized to repair the plurality of vehicles being vehicle parts data, one or more processors, and one or more non-transitory memories coupled to the one or more processors. The one or more non-transitory memories include computer executable instructions stored therein that specially configure the one or more processors such that, when executed by the one or more processors, the computer executable instructions cause the computer device to: (a) obtain information indicative of damage to a specific vehicle, (b) access the vehicle parts data using the access mechanism, and (c) based on the information indicative of the damage to the specific vehicle, filter the accessed vehicle parts data to obtain filtered vehicle parts data indicative of a subset of the plurality of parts that were utilized to repair a subset of the plurality of vehicles, wherein at least one of: (i) a type of at least some members of the subset of the plurality of vehicles is a type of the specific vehicle, or (ii) at least some of the damage to the specific vehicle is equivalent to respective damage of at least some of the members of the subset of the plurality of vehicles prior to repair. The computer executable instructions further cause the computer device to: (d) analyze the filtered vehicle parts data to determine, for each member of the subset of the plurality of parts, a likelihood that the each member will be utilized in repairing the damage to the specific vehicle, (e) generate a list of parts based on the likelihoods determined by analyzing the filtered vehicle parts data, and (f) cause the list of parts to be at least one of transmitted from the computing device using the one or more communication interfaces or displayed at a user interface.

In yet another embodiment, a computer readable storage medium comprises non-transitory computer readable instructions stored thereon that specially configure one or more processors of a computing device. When executed by the one or more processors, the computer readable instructions cause the computing device to obtain information indicative of damage to a specific vehicle, access the vehicle parts data using the access mechanism, and, based on the information indicative of the damage to the specific vehicle, filter the accessed vehicle parts data to obtain filtered vehicle parts data indicative of a subset of the plurality of parts that were utilized to repair a subset of the plurality of vehicles, wherein at least one of: (i) a type of at least some members of the subset of the plurality of vehicles is a type of the specific vehicle, or (ii) at least some of the damage to the specific vehicle is equivalent to respective damage of at least some of the members of the subset of the plurality of vehicles prior to repair. The computer readable instructions further cause the computing device to analyze the filtered vehicle parts data to determine, for each member of the subset of the plurality of parts, a likelihood that the each member will be utilized in repairing the damage to the specific vehicle, generate a list of parts based on the likelihoods determined by analyzing the filtered vehicle parts data, and cause the list of parts to be at least one of transmitted from the computing device using the one or more communication interfaces or displayed at a user interface.

DETAILED DESCRIPTION

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents. As used herein, the term "vehicle" may include a car, an automobile, a motorcycle, a truck, a recreational vehicle, a van, a bus, a boat or other amphibious vessel, heavy equipment, or any other insurable mode of transportation.

Figure 1:
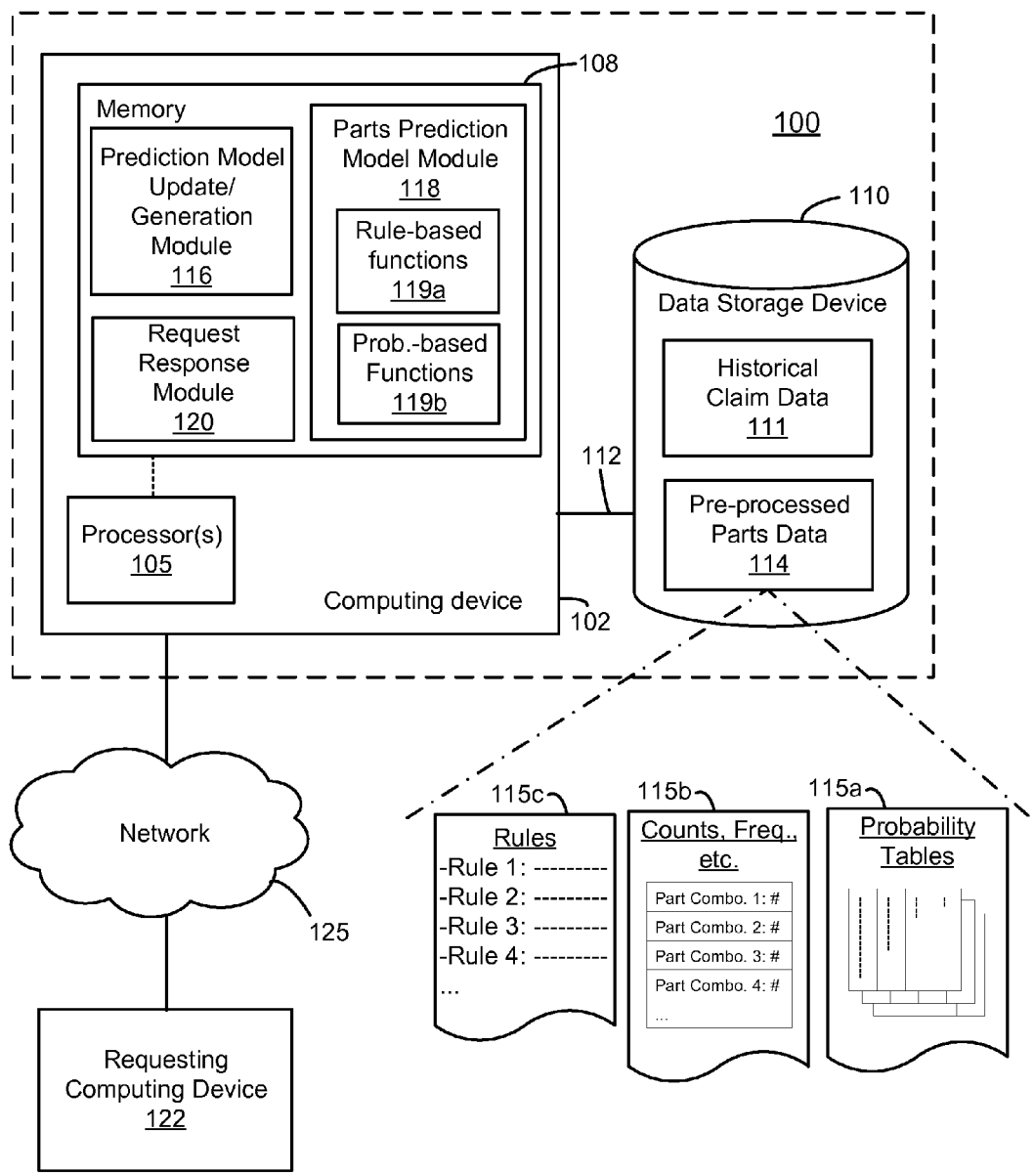
FIG. 1 is a block diagram of an exemplary system for predicting parts for a vehicle insurance claim.

FIG. 1 is a block diagram of an exemplary system 100 for predicting parts needed to repair a damaged vehicle (e.g., parts that will need to be utilized in the repair of the damaged vehicle) and/or for generating parts-related recommendations based on historical data indicative of parts that have been utilized in the actual repairs to other damaged vehicles. Generally, the system 100 allows a list of parts that are predicted to be utilized in repairing a damaged vehicle to be generated more accurately or precisely and more quickly than currently known parts prediction methods and systems. For example, the system 100, which is specially configured, as discussed herein, to predict parts and/or generate parts-related recommendations, may allow insurance companies to more quickly settle claims, repair shops to more accurately and quickly generate estimates for the repair of vehicles, e-commerce or other retailers to more quickly and accurately recommend parts to customer, and insurance claim adjustors to more quickly modify lists of parts corresponding to a damaged vehicle than currently known parts prediction methods and systems. For instance, the system 100 may result in the decrease of the total number of supplements (as well as corresponding time and personnel resources) needed to settle a claim, as an accurate list of parts is able to be ascertained much earlier in the claims resolution process.

To illustrate these and other benefits of the system 100 and/or of the other novel techniques, systems and methods described herein, the descriptions herein are discussed with respect to two example scenarios, which are referred to throughout in an illustrative but non-limiting manner.

In a first example scenario, the system 100 generates an initial or comprehensive list of predicted parts based on information about a vehicle and damage to the vehicle (e.g., gathered at a First Notice Of Loss, or "FNOL"). For example, the system 100 may receive or obtain information such as a vehicle type (truck, car, make, model, year, etc.), indications of damage points representing specific areas and/or degrees of damage to the vehicle, an indication of whether the vehicle is drivable, an indication of whether airbags of the vehicle have been deployed, etc. Based on this information, the system 100 generates a list of parts that will most likely be needed to repair (e.g., that are most likely to be actually utilized in the repair of) the vehicle. In some implementations, a specialized routine configured to generate these predictions utilizes historical data about previously damaged and/or repaired vehicles to predict the list of parts needed to repair the currently damaged vehicle, where the previously damaged and/or repaired vehicles are similar to a currently damaged vehicle.

In a second scenario, an insurance adjuster, or other person (e.g., mechanic) involved in the repair of a damaged vehicle independently generates an initial list of parts that he or she believes may be necessary to repair the vehicle. For example, the person may include the initial list of parts in an initial estimate to repair of a vehicle. Using the initial list of parts and based on information about the damaged vehicle and/or information about at least some of the parts in the initial list of parts, the system 100 revises the initial list, generates one or more recommendations for additional parts that are also likely to be required or utilized in repairing the vehicle but are not included on the initial list, and/or generates one or more recommendations to remove certain parts, from the initial list, that have a low likelihood of being utilized in repairing the vehicle. In this manner, the system 100 may assist insurance adjusters and/or other individuals (e.g., mechanics, repair facility employees, etc.), in the generation of accurate estimates and costs for the repair of vehicles and/or in the recommendation of parts for the repair of vehicles early in the claim settlement process, in an implementation.

Although the current techniques for predicting parts are described herein with respect to the above two scenarios, any or all of the techniques, systems, and/or method disclosed herein may additionally or alternatively be utilized in other scenarios, in some implementations. For example, the system 100 may predict parts likely to be utilized in upgrading or modifying an undamaged vehicle, performing regular service on an undamaged vehicle, suggesting related parts to customers of an e-commerce retailer of parts, etc.

The parts predicted by the system 100 (e.g., the parts that are to be needed or utilized in the repair of a vehicle) may include any suitable parts that are utilized in the replacing, modification, upgrading, etc. of damaged portions of the vehicle. By way of example, the term "parts," as generally used herein, may include parts to replace the damaged parts of a vehicle, such as bumpers, brackets, fenders, engine parts, windows, trim, wheels, etc. Generally, however, the term "parts," as utilized herein, may also refer to other parts, materials, or even services that are utilized in the repair of the vehicle for purposes other than replacing damaged parts. For example, the term "parts" may include painting services, wheel balancing, engine tuning, on-board computer modifications or updates, etc.

Returning now to FIG. 1, the system 100 for predicting the parts needed to repair a damaged vehicle (or that will be utilized in the repair of the damaged vehicle) includes a computing device 102, which for the sake of illustrating the principles described herein is shown as a simplified block diagram of a computer. However, such principles apply equally to other electronic devices, including, but not limited to, cellular telephones, personal digital assistants, wireless devices, laptops, cameras, tablets, smart phones or devices, media players, appliances, gaming systems, entertainment systems, set top boxes, automotive dashboard electronics, etc. specially configured to predict parts for a damaged vehicle. In some embodiments, the computing device 102 may be a server or a network of computing devices, such as a public, private, peer-to-peer, cloud computing or other known network.

The example computing device 102 includes at least one processor 105 and at least one non-transitory, tangible computer-readable storage media or device 108, such as a memory. The computing device 102 may be a single computing device 102, or may be a plurality of networked computing devices. In some cases, the computing device 102 is associated with an insurance carrier. In some cases, the computing device 102 is associated with a repair facility. In some cases, the computing device 102 is associated with a third party that is not an insurance carrier (e.g., does not directly sell or issue insurance policies) and that is not a repair facility (e.g., does not perform vehicle repairs), but nonetheless is in communicative connection with a computing device associated with the insurance carrier and/or with a computing device associated with a repair facility.

As shown in FIG. 1, the example computing device 102 is operatively connected to a data storage device 110 via a link 112, or a "data access mechanism." The data storage device 110 may be a single storage device, or may be one or more networked data storage devices. Although FIG. 1 illustrates the data storage device 110 as being separate from the computing device 102, in some embodiments the data storage entity 110 is contained within the same physical entity as the computing device 102. The link 112, or data access mechanism, may be as simple as a memory access function or mechanism, or it may be a wired, wireless, or multi-stage connection through a network. Many types of links are known in the art of networking and may be contemplated for use in the system 100.

The example data storage device 110 includes or stores vehicle insurance claim data 111, such as claim data related to historical vehicle insurance claims from one or more insurance companies or carriers, and/or from other sources such as repair shops, body shops, accident report databases, etc. Typically, but not necessarily, the claim data 111 includes data related to historical vehicle insurance claims from multiple insurance companies or carriers. Data included in the claim data 111 from a particular historical vehicle insurance claim may include respective indications of a plurality of claim properties, such as lists of parts utilized in the actual repair of vehicles, costs of parts utilized in the actual repair of vehicles, a final claim settlement amount, other amounts and/or scores associated with the particular claim, vehicle owner and/or insured information, information regarding the accident or incident resulting in the particular claim, and/or vehicle information (e.g., make, model, odometer reading, etc.). The claim data 111 may include data from vehicle insurance claims that have been settled and/or may include data from vehicle insurance claims that have not yet finished being settled. The claim data 111 and/or similar types of data corresponding to vehicle insurance claims are generally referred to interchangeably herein as "claim data," "vehicle insurance claim data," "historical insurance claim data," "historical claim data," and "historical parts data."

Further, at least some of the claim data 111 may correspond to a partial or a total loss claim. For a partial loss claim, typically the vehicle was repaired by one or more repair facilities, and thus the corresponding historical claim data may include claim properties corresponding to an initial repair estimate, a final settlement amount between the insurance company and one of the repair facilities, types and costs of replacement parts, labor costs, a location of the repair facility, and the like. Other types of claim properties that may be included for a partial loss claim are an indication as to whether or not a supplement was generated for the claim, and if a supplement was generated, the monetary amount of the supplement. The claim data 111 may include one or more claim properties corresponding to an indication of whether or not a re-inspection occurred for the claim, and if a re-inspection did occur, the cost of performing the re-inspection (e.g., cost to the insurance carrier and/or cost to the repair facility). Additionally, the claim data 111 may include one or more claim properties corresponding to the differential between an estimate that occurred after the re-inspection and an estimate performed prior to the re-inspection (e.g., an estimate performed at First Notice of Loss (FNOL) or other estimate). For a total loss claim, such as when a vehicle was stolen or was totaled, the corresponding portion of the claim data 111 may include claim attributes corresponding to a location of vehicle loss and an amount of a payment from the insurance carrier to the insured.

A list of types of claim data information, parameters, or properties that may be included in the claim data 111 follows:
Insurance policy number
Insurance company or carrier holding the insurance policy
Identification of insured party
Vehicle owner name; street, city and state address; zip code
Location (e.g., state and zip code) where vehicle loss occurred
Zip code where vehicle is garaged
Vehicle driver name; age; street, city and state address; zip code
Vehicle Identification Number (VIN)
Vehicle make, model, model year, country of origin, manufacturer
Vehicle type or body style (e.g., sedan, coupe, pick-up, SUV, wagon, van, hatchback, convertible, etc.)
Vehicle odometer reading
Vehicle engine size, color, number of doors
Whether or not the vehicle is leased
Age of vehicle
Condition of vehicle
Settlement amount between insurance company and repair facility
Payout amount (if any) to insured party or party holding the insurance policy
Loss date
Vehicle appraisal inspection location and responsible adjuster
Primary and secondary point of impact
Damage points representing specific damage locations and degree of damage
Vehicle drivable condition
Airbag deploy condition
Qualitative severity of damage
Quantitative severity of damage
Velocity of vehicle just prior to impact
Change in velocity of vehicle due to impact
Vehicle dimension score
Vehicle repair score
Initial estimate
Estimate or prediction of settlement at FNOL
Estimate from another repair facility or party
One or more additional estimates and indications of when during the claim settlement process the additional estimates occurred
Occurrence of one or more re-inspections
Cost to perform each re-inspection
Revised estimate after re-inspection and corresponding repair work/parts
Occurrence of one or more supplements paid from insurance company to repair facility
Monetary amount of each supplement
Level of desired target quality of repair
Level of actual quality of repair
Deductible
Towing and storage costs
Labor hours and costs for replacement and/or repair, and
Type of labor (e.g., sheet metal, mechanical, refinish, frame, paint, structural, diagnostic, electrical, glass, etc.)
Type of replacement part (e.g., OEM (Original Equipment Manufactured), new, recycled, reconditioned, etc.)
Cost of replacement part, material, or service used in repair
Paint costs
Tire costs
Hazardous waste disposal costs
Repair facility name, location, state, zip code
Drivability indicator
Repair shop certifications
Repair shop classifications
Repair shop capacity
Repair shop characteristics
Appraiser certifications
Appraiser performance
Appraiser seniority
Appraiser characteristics As illustrated in the above, some of the claim parameters or attributes of claim data 111 are vehicle parameters that are indicative of attributes of a vehicle. Some claim parameters or attributes are indicative of attributes of a driver, an owner, or an insured party of the vehicle, and some claim parameters or attributes may pertain to the insurance policy itself and/or to the resolution of the claim. Some claim parameters or attributes are indicative of the impact, collision or damage-causing incident. Some claim parameters or attributes are indicative of the locations and/or severity of damage to the vehicle. It is understood that not all the data for historical insurance claims represented in the claim data 111 is required to include every claim attribute in the list above. Indeed, some data or vehicle claims in the claim data 111 may include claim attributes that are not on the list.

The example data storage device 110 also stores pre-processed parts data 114 that has been generated based on at least some of the historical vehicle insurance claims represented in the claim data 111. As used herein, the term "pre-processed parts data" includes any suitable numerical values, parameters, rules, functions, data, etc. that have been generated prior to the operation or execution of a model to predict parts for a damaged vehicle.

In particular, the example pre-processed parts data 114 includes frequencies, counts, probabilities, and/or or other measures corresponding to individual parts and/or groups/combinations of individual parts, where the parts were utilized in the previous repairs of vehicles. Specifically, the pre-processed parts data 114 is generated at least partially based on the historical claim data 111, in an embodiment. In an example, the pre-processed parts data 114 includes, for one or more parts and/or groups of parts indicated in the claim data 111, a table of probabilities (as illustrated by the tables 115a). Each probability included in the tables 115a may represent a probability that, for a particular part or a particular group of parts included in the claim data 111, one or more other parts included in the claim data 111 are combined or used with the given particular part or group of parts in order to effect repairs. That is, the pre-processed parts data 114 may indicate conditional probabilities or other measures of probability of needing one or more additional parts given certain individual, combinations, or groups of parts. The example pre-processed parts data 114 also includes various counts or frequencies of particular parts and/or particular group or combinations of parts (as illustrated by the counts/frequencies 115b). For example, the pre-processed parts data 114 may include one or more numerical values (e.g., integers) representing the number of times certain parts were combined with certain other parts in the claim data 111, and/or representing the number of times a part appeared/occurred in multiple estimates and/or supplements that occurred throughout the lifecycle of a particular insurance claim represented in the claim data 111. In some implementations, the example pre-processed parts data 114 stores various rules (as illustrated by the rules 115c) that are utilized in the prediction of parts. These rules may be derived from the claim data 111 and/or from counts, frequencies, probabilities, etc. generated based on the claim data 111, and are further discussed in more detail below.

Generally, the pre-processed data 114 includes any suitable combination of probabilities, frequencies, counts, rules, etc. indicating the likelihood that certain parts are combined with other parts, and/or the likelihood that certain parts are utilized in the repair of certain types of damages and/or in the repair of certain types of vehicles. By persistently storing such data in the pre-processed parts data 114, certain functions of the computing device 102, as discussed below, may complete faster (e.g., in less time or in fewer processor cycles) than if data similar to the pre-processed parts data 114 was generated "on-the-fly." However, the computing device 102 may, in some implementations, generate data similar to the pre-processed parts data 114 in near real time or only when required or when desired to complete certain functions of the computing device 102.

Further, in some embodiments, at least some of the pre-processed parts data 114 includes indexed frequencies, probabilities, rules, counts, etc. That is, the computing device 102 and/or or other computing devices may access certain information (such as probabilities) stored in the pre-processed parts data 114 via a database or tabular lookup scheme based on an index (e.g., a numerical index). In this manner, costly transfers of data between the computing device 102 and the data storage device 110 may be reduced and/or performed with increased efficiency, in some implementations. Further discussion of the generation and usage of pre-processed parts data 114 is provided in a later section.

Turning now to the computing device 102, the memory 108 includes non-transitory, tangible computer-readable storage media, such as, but not limited to RAM (Random Access Memory), ROM (Read Only Memory), EEPROM (Electrically Erasable Programmable Read-Only Memory), flash memory or other memory technology, CD (Compact Disc)-ROM, digital versatile disks (DVD) or other optical disk storage, magnetic cassettes, magnetic tape, magnetic disk storage or other magnetic storage devices, biological memories or data storage devices, or any other medium which can be used to store desired information and which can be accessed by the processor 105. In some embodiments, the memory 108 comprises more than one computer-readable storage media device and/or device type.

The example computing device 102 includes a parts prediction model module 118, thereby particularly configuring the computing device 102 to predict parts and/or to predict part recommendations. In an embodiment, the parts prediction model module 118 may comprise computer-executable instructions that are stored on the memory 108 and that are executable by the processor 105. Generally, the parts prediction model module 118 includes rule-based functions 119a and/or probability-based functions 119b that allow the parts prediction model module 118 to predict parts that are likely to be needed in the repair of damaged vehicles in at least the two example scenarios described above. In both the first and the second scenarios, for example, the parts prediction model module 118 receives, as input, information about a damaged vehicle, such as a vehicle type, damage points or other representations of specific damage to the vehicle (and, optionally, respective degrees of damage of said damage points), an indication of whether the vehicle is drivable, an indication of whether airbags of the vehicle have been deployed, etc., and/or indications of other types of parameters that are included in the claim data 111 and/or in the pre-processed parts data 114. The parts prediction model module 118 applies one or more rule-based functions 119a and/or probability-based functions 119b to the input, and outputs or generates one or more predictions indicating the parts that are likely to be needed or actually utilized in the repair of the damaged vehicle.

In the second scenario in which an initial list of parts has been generated a priori, e.g., by an insurance adjuster, the parts prediction model module 118 receives, as input, one or more specific parts that are included in the initial list, and thus may be already associated with an estimate to repair a vehicle. For example, an insurance claim adjuster or mechanic may generate an initial estimate to repair a vehicle, where the initial estimate includes an initial or draft list of parts needed to repair the vehicle. A computing device operated by the adjuster or mechanic may feed or transmit this initial or draft list of parts and selected information about the vehicle and/or about the damage to the vehicle to the parts prediction model module 118. Based on at least a part of the initial/draft list of parts, the parts prediction model module 118 generates or outputs one or more indications of additional parts that are likely to be needed in the repair of the vehicle, and/or generates or outputs one or more recommendations to remove parts from the initial list of parts (e.g., based on a high likelihood that the parts will not be needed or utilized in the repair of the vehicle). Generally, in this second scenario, the parts prediction model module 118 may generate recommendations to modify an initial list of parts in any suitable manner, including adding parts to, removing parts from, reordering parts in, modifying costs associated with, etc. the initial list of parts.

In either of the first or the second scenarios, the parts prediction model module 118 may output or transmit the list of parts in any suitable format for any suitable subsequent use. Further, in the second scenario, the parts prediction model module 118 may additionally or alternatively output or transmit indications of one or more parts-related recommendations in any suitable format for any suitable subsequent use. In some cases, the parts prediction model module 118 may output or transmit lists of parts and/or recommendations as text files, tabular documents, Hypertext Markup Language (HTML) files, or other suitable files to be sent to be sent to remote computing devices for display on the remote computing devices. In other cases, the output of the parts prediction model module 118 may be utilized as input to other routines, algorithms, user interfaces, etc. executed on the computing device 102 or other computing devices. For example, the parts prediction model module 118 may generate lists of parts for transmission to another routine configured to generate estimates, communications, records, insurance documents, etc. based on the list of parts. In such cases, the output of the parts prediction model module 118 is formatted in specific manners so as to be operated on by the other routines, algorithms, etc.

The example computing device 102 further includes a prediction model/update generation module 116, thereby particularly configuring the computing device 102 to generate or update the parts prediction model module 118 and/or the pre-processed parts data 114. In particular, the prediction model update/generation module 116 may generate/update the rules 115c used by the rule-based functions 119a of the parts prediction model module 118, generate/update the rule-based functions 119a themselves, generate/update the frequencies/counts 115b, generate/update the probability tables 115a, and/or generate/update the probability-based functions 119b of the parts prediction model module 118. The prediction model update/generation module 116 may, for example, comprise computer-executable instructions that are stored on the memory 108 and that are executable by the processor 105.

In some implementations, to update at least some of the rule-based functions 119a of the parts prediction model module 118 and/or to update at least some of the rules 115c stored in the pre-processed data 114, the prediction model update/generation module 116 implements an analysis of at least some portions of the historical claim data 111 similar to a "market basket" or "product affinity" analysis. That is, based on a frequency of pair or groups of parts in the insurance claims represented by the claim data 111, the prediction model update/generation module 116 may determine conditional rules such as: if a first part (e.g., a bumper) is utilized to repair a certain vehicle (e.g., a 2012 car of a certain make and model), then a second part (e.g., a mounting bracket for the bumper) is likely to be needed in the repair of the vehicle. In some implementations, the prediction model update/generation module 116 may associate a measure of likelihood, or probability, with each of these generated rules based on frequencies of pairing, association, combinations, groups, or groupings of parts in the claim data 111. In the above example, the prediction model update/generation module 116 may generate a likelihood of 80% that the second part is needed when the first part is included in the repair.

Generally, rules generated by the prediction model update/generation module 116 (such as the rules 115c) for the rule-based functions 119a of the parts prediction model module 118 include any number of conditional statements or criteria, and may have associated therewith any number of likelihood measure or other parameters. By way of example and without limitation, a certain rule 115c generated by the prediction model update/generation module 116 and utilized by the rule-based functions 119a of the parts prediction model module 118 may state: if part A is needed, parts C and D are also needed with respective likelihoods of 50% and 62%. In another example, a certain rule 115c generated by the prediction model update/generation module 116 and utilized by the rule-based functions 119a of the parts prediction model module 118 may state: if parts A, B, C, and D are needed, if the vehicle is manufactured before 2007, and if the vehicle is primarily driven in the "salt belt" region of the U.S., parts E, F, and G are also needed with respective likelihoods of 71%, 87.2%, and 64%.

Alternatively or additionally, in some situations, the prediction model update/generation module 116 generates probabilities and/or statistical data (such as the frequencies/counts 115b and/or the probability tables 115a) used by the probability-based functions 119b of the parts prediction model module 118. In an example, the prediction model update/generation module 116 counts, appearances or occurrences of one or more pairs or other groupings/combinations of parts in historical records, such as found in the claim data 111 generated from historical vehicle claims. For example, a first grouping includes a set of parts A and B; a second grouping includes a different set of parts A, B, and C; a third grouping includes yet another set of parts B, D, E, and F; and the prediction module update/generation module 116 counts respective occurrences of the first, second, and third groupings or sets of parts in the historical claim data 111. Based on these respective counts of the one or more groupings, the prediction model update/generation module 116 generates conditional probabilities for the one or more combinations or groupings of parts using pre-defined definitions of conditional probability dependent on their respective counts (e.g., formulas based on Bayes Rule, geometric means, or other suitable probabilistic rules, theorems, or functions) and, in some cases, at least partially dependent on information about damage to a vehicle (type of vehicle, location of damage, etc.).

For example, a conditional probability for the first parts grouping A and B may indicate a probability that part A will be utilized in a repair given that part B is utilized, or vice versa. In another example, a first conditional probability for the second parts grouping A, B, and C may indicate a probability that part C will be utilized in a repair given that parts A and B are utilized in the repair, and a second conditional probability for the second parts grouping A, B, and C may indicate a probability that parts A, B, and C will be utilized to repair a particular type of damage, e.g., an impact of a certain amount received at the upper left hand quadrant of the driver's door. In some cases, the prediction model update/generation module 116 stores these conditional probabilities in the pre-processed parts data 114, e.g., in the frequencies/counts 115b and/or in the probability tables 115a. When operating, the probability-based functions 119b of the parts prediction model module 118 may query the pre-processed parts data 114 for one or more conditional probabilities, and the probability-based functions 119b and/or the parts prediction model module 118 may predict a list of parts and/or may make one or more recommendations (e.g., recommending a change from repairing a certain part to replacing the certain part, or vice versa, or recommending that the addition of another part to the list of predicted parts would result in a "total loss") based on the conditional probabilities.

In other examples, the prediction model update/generation module 116 may generate and/or utilize distributions of certain parts or pairs of parts in addition to generating conditional probabilities. In fact, in some cases, the prediction model update/generation module 116 may primarily or solely utilize distributions instead of conditional probabilities. By way of example, these distributions may take the form of arrays of data based on and/or including counts, appearances or occurrences of one or more pairs or other groupings/combinations of parts in historical records, such as found in the claim data 111 generated from historical vehicle claims. Distributions for a part and/or combinations of parts may also be modeled using parameterized functions (e.g., a Gaussian or Poisson distribution), where parameters of the functions are based on counts, appearances or occurrences of one or more pairs or other groupings/combinations of parts in historical records. In some cases, the prediction model update/generation module 116 may store these distributions (e.g., arrays or parameterized functions) in the pre-processed parts data 114, e.g., in the frequencies/counts 115b and/or in the probability tables 115a.

The prediction model update/generation module 116 also updates the rules 115c, rules-based functions 119a, probabilities 115a, 115b, and/or probability-based models/functions 119b of the parts prediction model module 118 over time based on feedback information, in some implementations. The feedback information may include vehicle insurance claim data that has been newly added to the claim data 111 (e.g., for recently filed, completed, or settled insurance claims), actual parts lists utilized in the repair of vehicles, insurance claim supplement information, etc. In an example, the parts prediction model module 118 outputs or predicts a certain list of parts for the repair of a vehicle at FNOL. Following the actual repair of the vehicle by a repair shop, a similar, but not identical, list of parts that were actually utilized to repair the vehicle are added to the claim data 111. The prediction model update/generation module 116 may update probabilities, counts, frequencies, etc. of the pre-processed claim data 114 based on such differences between actual and predicted parts lists and/or based on other feedback information. In this manner, the prediction model update/generation module 116 may allow the parts prediction model module 118 to generate increasingly accurate predictions of parts over time. Thus, the specially configured functionality of the computing device 102 may be improved or refined over time.

The prediction model update/generation module 116 may operate at any suitable pre-determined, or otherwise defined, times. In some implementations, the prediction model update/generation module 116 operates to update rules, counts, etc. upon receiving feedback information, such as actual lists of parts utilized to repair vehicle. Additionally or alternatively, the prediction model update/generation module 116 operates periodically or upon an interaction of a user with the system 100 (e.g., via a user interface or remote computing device) and/or based on a user instruction or command, regardless of an amount of feedback information available or received. The prediction model update/generation module 116 may also operate, in some implementations, at times during which the parts prediction model module 118 or other modules, engines, applications, etc. of the computing device 102 are operating, without disrupting the operation of the modules, engines, applications, etc. (e.g., the prediction model update/generation module 116 operates in the "background" of the computer device 102).

After the parts prediction model module 118 (including rules, rule-based functions/operations, probabilities, probability-based functions/operations, etc.) is generated, updated, and/or modified by the prediction model update/generation module 116, the prediction model update/generation module 116 may store the generated, updated, and/or modified parts prediction model module 118 in the memory 108 and/or may store the generated, updated, and/or modified rules, probabilities, counts, etc. in the pre-processed parts data 114.

The example computing device 102 includes a request response module 120, thereby particularly configuring the computing device 102 to respond to requests for predicted parts and/or parts recommendations. In an embodiment, the request response module 120 may comprise computer-executable instructions that are stored on the memory 108 and that are executable by the processor 105. The request response module 120 receives or obtains a request to determine predicted parts (e.g., in the first or the second scenario) or to determine parts-related recommendations (e.g., in the second scenario) for a particular vehicle insurance claim, e.g., for a new claim or for a claim that is not included in the historical claim data 111. For example, the request is received from a requesting entity or computing device 122.

In FIG. 1, the requesting entity is illustrated as being a requesting computing device 122, but this is only exemplary, as the requesting entity may be another type of entity such as a human who interacts with the system 100 via a local or remote user interface. In FIG. 1, the requesting computing device 122 is shown as being communicatively coupled to the computing device 102 via a network 125. The network 125 may be, for example, a private local area network, a wide area network, a peer-to-peer network, a cloud computing network, the Internet, a wired or wireless network, or any combination of one or more known public and/or private networks that enable communication between the computing devices 122 and 102. In some embodiments, the network 125 is omitted, such as when the computing device 122 and the computing device 102 are directly connected or are an integral computing device.

In some embodiments, the requesting computing device 122 may be a tablet, laptop, smart device, server, or other computing device that is associated with, owned or operated by the insurance company. For example, the requesting computing device 122 may be a tablet, laptop, or smart device used by a field assessor while the assessor is at a field site inspecting vehicle damage, e.g., at FNOL. In another example, the requesting computing device 122 may be a back-end computing server or network of computing devices of the insurance company that processes all incoming claims, or the requesting computing device 122 may be a host of a website that agents of the insurance company are able to access via a browser.

In some embodiments, the requesting computing device 122 may be a tablet, laptop, smart device, server, or other computing device associated with, owned or operated by the repair facility. For example, the requesting computing device 122 may be a tablet, laptop, smart device, or desktop computing device located at the repair facility that is used to track customers and repairs to their vehicles. In another example, the requesting computing device 122 may be a computing server or network of computing devices at a back-end office of an owning company of the repair facility that processes vehicle repair work orders related to insurance claims for many repair facilities.

Returning to the computing device 102, the request response module 120 stored thereon is configured to receive the request for predicted parts and/or parts recommendations for the particular vehicle insurance claim. For example, in the second scenario, the request includes an indication of an initial or draft list of parts (e.g., that has been previously generated by an insurance adjuster or other party), and may or may not include information about the particular vehicle and/or information about damage to the particular vehicle. In the first scenario, the request may simply include information about the particular vehicle and information about damage to the particular vehicle. In any event, the request response module 120 may cause the parts prediction model module 118 to execute upon receiving the request, and the parts prediction model module 118 may predict, based on the contents of the request, the one or more parts that are predicted to be needed in the repair of the particular vehicle, and/or one or more parts recommendations, such as recommendations to add and/or remove parts from an initial list of parts associated with an insurance claim, recommendations to change an operational code. An "operational code," as used herein, generally refers to a short-hand indication to a user, such as an agent of an insurance company or repair facility, of an action corresponding to repairing the vehicle damage. For example, an operational code change may indicate changing a repair of a certain part to a replacement of the certain part, recommendations to increase/decrease an amount of labor (e.g., number of hours) needed to repair the damaged vehicle, etc. The request response module 120 may then, based on output from the parts prediction model module 118, send or transmit to the remote computing device 122 indications of the predicted parts and/or parts recommendations.

It is noted that the request received by the system 100 (e.g., from the remote computing device 122) may take any known form, such as a message, a data transfer, a web-service call, or some other action taken by an application or function.

In some embodiments, the computing device 102 includes a supplement prediction model module 130. For example, the parts prediction model module 118 and/or other models, routines, modules, etc. of the computing device 102 may operate in conjunction with an execution of the supplement prediction model 130, which supplement prediction model 130 predicts a supplement to an insurance claim on the damaged vehicle (e.g., a probability of the supplement is equal to or above a threshold value). In this manner, the parts prediction model module 118 may predict a list of parts that is likely to be included on the predicted supplement (e.g., in addition to an initial list of parts on an insurance claim). For example, the supplement prediction model 130 may operate as described in U.S. patent application Ser. No. 14/168,345, entitled "SYSTEM AND METHOD OF PREDICTING A VEHICLE CLAIM SUPPLEMENT BETWEEN AN INSURANCE CARRIER AND A REPAIR FACILITY." In an embodiment, the supplement prediction model module 130 comprises a set of computer-executable instructions that is stored on the memory 108 and that is executable by the processor 105.

With particular regard to the prediction model update/generation module 116, the parts prediction model module 118, the request response module 120, and the supplement prediction model module 130, while these modules 116, 118, 120, 130 are illustrated in FIG. 1 as separate entities, this is only for the purposes of clarity of discussion. In other embodiments (not shown), at least two of the modules 116, 118, 120, 130 may be included in a single module, or may comprise a single set of computer-executable instructions. Further, although FIG. 1 illustrates the prediction model update/generation module 116, the parts prediction model module 118, the request response module 120, and the supplement prediction model 130 being stored on and executed by the same computing device 102, in some embodiments, at least two of the two modules 116, 118, 120, 130 are stored on and executed by different computing devices or systems that are in communicative connection with each other.

Still further, although FIG. 1 illustrates the pre-processed parts data 114 as being stored on the data storage device 110, the computing device 102 may store at least some portions of the pre-processed parts data 114, in an embodiment. For example, the parts prediction model module 118 itself may include pre-processed rules, counts, frequencies, probability tables, etc. generated by the prediction model update/generation module 116. In fact, by including at least a portion of the pre-processed parts data 114 in the parts prediction model module 118, or elsewhere on the memory 108, implementations of the computing device 102 may be configured to predict parts and/or generate parts-related recommendations without a need to transfer pre-processed data 114 or portions of the claim data 111 between the data storage device 110 and the computing device 102.

In some embodiments, the computing device 102 is associated with, owned or operated by the insurance company that issued the policy under which the damaged vehicle is covered. For example, the computing device 102 may be a back-end server or network of computing devices of the insurance company that store and execute the instructions 120 for responding to requests (e.g., from computing devices 122 of field assessors or agents), and may be in communicative connection with another computing device (not shown) that stores and executes the instructions 116 for determining, generating, or updating the parts prediction model module 118.

In some embodiments, the computing device 102 is associated with, owned or operated by the repair facility that is to repair the damaged vehicle. For example, the computing device 102 may be a back-end server or network of computing devices of an owning parent company of the repair facility that stores and executes the module 120 for responding to requests from multiple computing devices 122 of various repair facility store fronts or franchise locations, and may be in communicative connection with another computing device (not shown) that stores and executes the module 116 for generating and/or updating the parts prediction model module 118.

In some embodiments, the computing device 102 is associated with, owned or operated by a third party that is not the insurance company that issued the policy under which the damaged vehicle is covered, and is not one of the repair facilities that is to repair the vehicle damages. For example, the computing device 102 may be associated with a company or organization that provides predictive products and resources to multiple insurance companies, repair facilities, and other companies or entities associated with repairing damages to insured vehicles.

Figure 2:
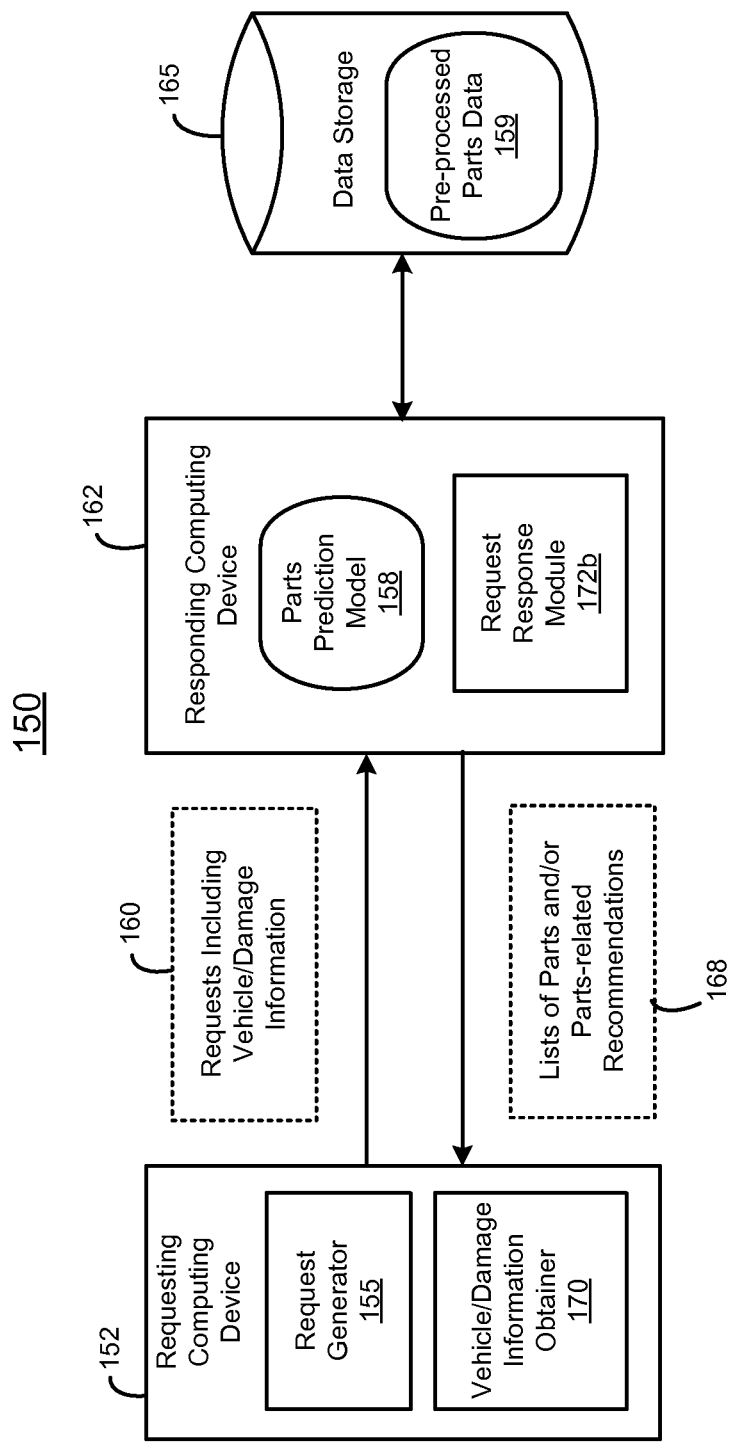
FIG. 2 illustrates an example data flow between components of an exemplary system for predicting parts for a vehicle insurance claim.

FIG. 2 depicts an exemplary data flow in an embodiment of a system 150 for predicting parts (bumpers, headlights, fenders, engine parts, paint, wheel balancing, engine tuning, etc.) needed to repair a damaged vehicle. The system 150 may be utilized in one of the two scenarios described above with reference to FIG. 1, or in another scenario. The system 150 includes a requesting computing device 152 with a memory and a processor, and the requesting computing device 152 is particularly configured to include a request generator 155 and/or a vehicle/damage information obtainer 170. The request generator 155 and/or the vehicle/damage information obtainer 170 may be, for example, respective sets of computer-executable instructions stored on the memory of the computing device 152 and executable by its processor. The requesting computing device 152 may operate in conjunction with embodiments of the system 100 of FIG. 1, and in some embodiments, the requesting computing device 152 is the requesting computing device 122 of FIG. 1.

The request generator 155 of the requesting computing device 152 is configured (e.g., may include executable instructions) to request 160 one or more predicted lists of parts (e.g., in the first or second scenarios), and/or to request 160 one or more other parts-related recommendations (e.g., a recommendation to remove a part from an initial list of parts in the second scenario), in an embodiment. For example, the request generator 155 of the computing device 152 may send a request 160 to a responding computing device 162 for a prediction of a list of parts and/or parts-related recommendations. In some embodiments, the responding computing device 162 is the computing device 102.

Requests 160 generated by the request generator 155 may include information about a damaged vehicle, such as a type of vehicle (make, model, year, etc.), representations of damage to the vehicle (damage points, images, deformation data, etc.) and optionally respective degrees of damage, an indication of whether the vehicle is driveable, an indication of whether airbags of the vehicle were deployed, etc. Further, in the second scenario, the request 160 additionally or alternatively includes indications of one or more parts that have been included in an initial list of parts. In some implementations, the request generator 155 generates requests that include only a minimum amount of information, where the minimum amount of information is the minimal set of information required by the responding computing device 162 to predict lists of parts or generate parts-related recommendations. In an example, the minimum amount of information included in requests from the request generator 155 and required by the responding computing device 162 includes only the set of parameters: a type of vehicle, representations of damage to the vehicle (damage points, images, deformation data, etc.), an indication of whether the vehicle is driveable, and an indication of whether airbags of the vehicle were deployed. In other examples, different parameters are included in the minimum set of parameters required by the responding computing device 162. To obtain the information that is to be included in a request 160 sent to the responding computing device 162, embodiments of the requesting computing device 152 implement a vehicle/damage information obtainer 170. The information obtainer 170 presents one or more user interfaces on a display device of the requesting computing device 152 to receive the vehicle/damage information, in some implementations. For example, an insurance adjuster or mechanic may operate the requesting computing device 152, and, when presented with one or more user interfaces generated by the information obtainer 170, the insurance adjuster or mechanic may enter (using selections of buttons, selections of menus, entering of text, capture of images, analysis and/or editing of images, etc.) vehicle/damage information via the one or more user interfaces. Generally, however, the vehicle/information obtainer 170 may obtain vehicle/damage information to be included in a request 160 by any other known means of obtaining information, such as retrieving information stored in a memory of the requesting computing device 152, retrieving information stored in a remote data storage device or database (not shown), retrieving information from devices being transported by the damaged vehicle (e.g., an on-board computer), etc.

The request generator 155 may, based on the obtained vehicle/damage information, request (e.g., via the request 160) predicted parts and/or other parts-related recommendations from the responding computing device 162, where the responding computing device 162 implements a parts prediction model 158. For example, the computing device 152 sends requests 160 to a responding computing device 162 that is specially or particularly configured to included and/or utilize a parts prediction model 158 (e.g., that may be stored in a non-transitory memory 108 of the computing device 162 and/or stored on the data storage device 165), and/or that is specially or particularly configured to include and/or utilize pre-processed parts data 159 (e.g., that may be stored in a non-transitory memory 108 of the computing device 162 and/or stored on a data storage device 165) to generate a response to the request 160. For example, a request response module 172 of the responding computing device 162 generates the response to the request 160. In an embodiment, the parts prediction module 158, the responding computing device 162, and the request response module 172 are the parts prediction model 108, the computing device 102, and the request response module 120, respectively.

The requesting 152 and the responding 162 computing devices may be directly or remotely connected via one or more public and/or private networks. In some embodiments of the system 150, the requesting computing device 152 and the responding computing device 162 have a client/server relationship. In some embodiments, the computing devices 152 and 162 have a peer-to-peer or cloud computing relationship, and in some embodiments, the computing devices 152 and 162 are an integral computing device. Other relationships between the computing devices 152 and 162 are also possible. Thus, the request 160 may take any known form, such as sending a message, transferring data, or performing a web-service call.

As described above, the request 160 includes vehicle/damage information, such as types of vehicles, representations of damage, etc. in both scenarios. However, in the second scenario in which an adjuster, or other individual, generates an initial list of parts, e.g., upon inspection of a vehicle or upon analyzing images of a vehicle, the request 160 additionally or alternatively includes the initial list of parts previously generated by insurance adjusters, mechanics, etc. For example, experienced insurance adjusters or mechanics generate an initial list of parts that estimates a list of parts needed to repair a damaged vehicle, and at least a portion of this initial list of parts is provided to the requesting computing device 152. Subsequently, the requesting computing device 152 may send a request 160 (based on at least a portion of the initial list of parts) to the responding computing device 162 to request a prediction of any additional parts that may be needed (e.g., in addition to the provided initial list of parts), to request recommendations to remove certain parts from the provided initial list of parts based on a low likelihood of utilization during the repair of the vehicle, and/or to request other parts-related recommendations (e.g., related to whether adding another part would make a repair a "total loss" or whether one or more parts should be replaced instead of repaired, etc.). For example, such a request 160 includes an indication of one or more of the parts indicated on the at least the portion of the initial list of parts generated by the insurance adjuster or mechanic and received at the requesting computing device 152, in the second scenario.

Upon receiving the request 160, the responding computing device 162 determines or predicts one or more parts that will be needed in the repair of the damaged vehicle based on the obtained vehicle/damage information, the parts prediction model 158, the pre-processed parts data 159, and/or the provided initial list of parts (or portions thereof), in an embodiment. For example, the vehicle/damage information included in the request 160 is input into, or sent or transmitted to the parts prediction model 158. The responding computing device 162 determines the list of parts and/or parts-recommendations from an output or result generated by the parts prediction model 158, and returns an indication 168 of predicted parts and/or parts-related recommendations to the requesting computing device 152. In some implementations, if the request 160 omits or provides an invalid value for certain vehicle/damage information required by the parts prediction model 158 to predict parts, the computing device 162: (i) processes the request 160 based on an approximate, default, or automatically estimated value of the missing information, and/or (ii) replies to the requesting computing device 152 with a message indicative of the missing information.

The example requesting computing device 152 receives the indication 168 of the predicted parts and/or the parts-related recommendations from the responding computing device 162, and may, in some implementations, cause at least some portions of the indication 168 to be presented at a user interface (e.g., of the requesting computing device 152 or of another computing device). The example requesting computing device 152 causes the indication 168 of the predicted parts and/or the parts-related recommendations to be transmitted to another computing device, in an embodiment. In some implementations, the requesting computing device 152 utilizes the indication 168 of the predicted parts and/or the parts-related recommendations to determine an estimate of a settlement amount or supplement amount for a vehicle insurance claim, and provides the estimate to a user interface and/or to another computing device.

Figure 3:
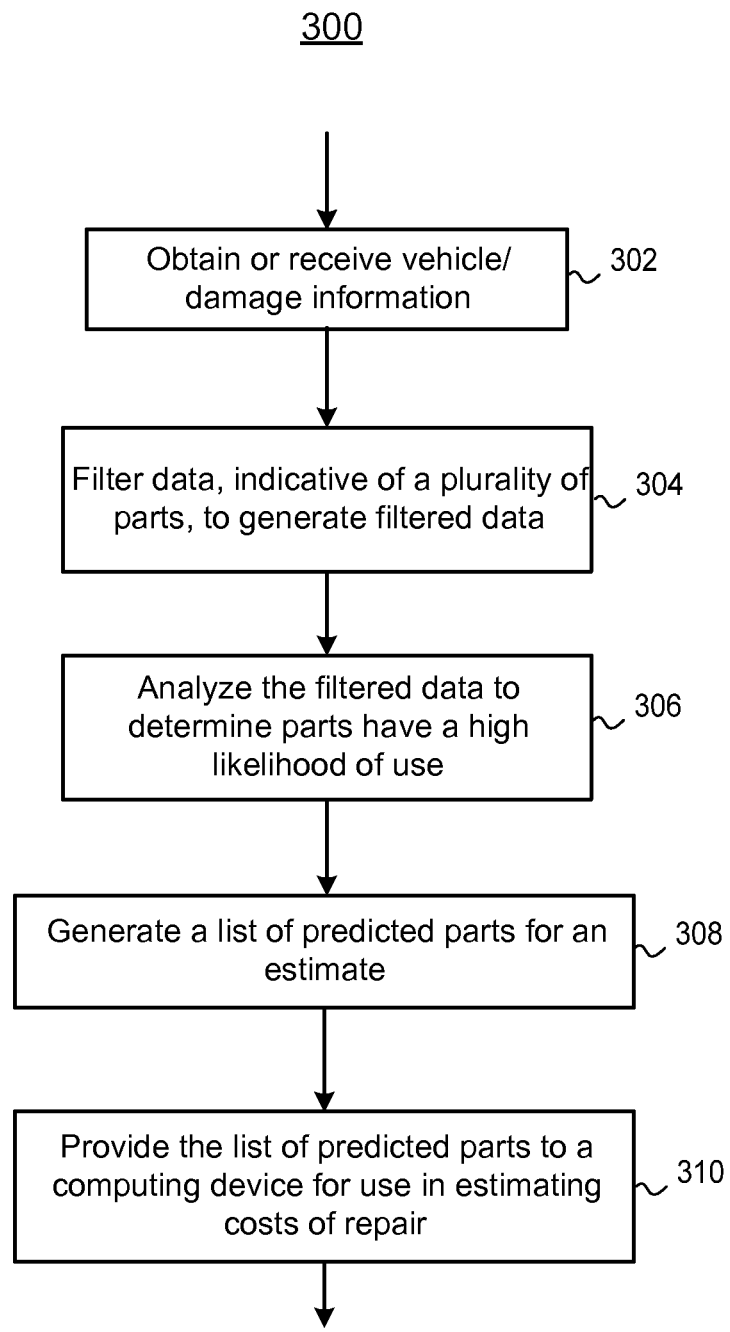
FIG. 3 is a flow diagram of an example method for predicting parts for a vehicle insurance claim which can be implemented by either one of the systems illustrated in FIGS. 1 and 2.

FIG. 3 is a flow diagram of an example method 300 for predicting parts that are needed to repair a damaged vehicle, such as in the first scenario described with reference to FIG. 1. The computer device 102 and/or the responding computing device 162 may implement at least a portion of the method 300, for example. However, while the example method 300 is discussed below with simultaneous reference to FIGS. 1 and 2, it is understood that other suitable computing systems may implement the example method 300.

In the example method 300, vehicle and/or damage information is obtained or received (block 302). For example, as illustrated in FIG. 2, the responding computing device 162 receives vehicle and/or damage information from the requesting computing device 152. By way of example, the vehicle/damage information includes: (i) a type and/or identification of a damaged vehicle, such as a make, model, year, corresponding insurance policy number, Vehicle Identification Number (VIN), license plate number, owner/driver names, etc.; (ii) representations of damage to the damaged vehicle, such as one or more collision deformation codes or "CDCs" (e.g., as defined by the Society of Automotive Engineers International Surface Vehicle Standard J224 or by some other standards body), images of damage to the vehicle (as described further in U.S. Pat. No. 8,239,220 and U.S. patent application Ser. No. 14/218,165), deformation data (as described further in U.S. patent application Ser. No. 14/218,148), indications of specific areas of the vehicle damaged ("points of damage" or "damage points"), etc.; (iii) an indication of whether the damaged vehicle is driveable; and/or (iv) an indication of whether airbags of the damaged vehicle were deployed.

Generally, the vehicle/damage information includes any suitable types, amounts, and combinations of data indicative of damage to a vehicle and/or indicative of the vehicle itself. A computing device, such as the responding computing device 162, may receive the vehicle/damage information in any suitable structure, such as text files, HTML or Hypertext Transfer Protocol (HTTP) files or messages, tabular files, etc.

The method 300 includes filtering data (block 304), such as the claim data 111, based on the received or obtained vehicle/damage information to generate a filtered set of data. In an embodiment, a parts prediction model, such as the parts prediction model module 118, filters the claim data 111 and, by using a filtered set of the claim data 111, the parts prediction model module 118 of the computing device 102 may more efficiently (e.g., in fewer cycles of the processor 105) identify probable parts needed to repair of the damaged vehicle early in the claims resolution process, in some implementations. In an example, the parts prediction model module 118 filters the claim data 111 to generate a set of filtered data representing parts utilized in the past to repair only certain vehicles, as opposed to utilizing the all of the claim data 111 which may represent parts utilized in the past to repair all vehicles indicated in the claim data 111. Specifically, the parts prediction model module 118 may filter the claim data 111 to generate filtered data representing parts utilized in the past to repair vehicles similar, in make, model, year, etc., to the damaged vehicle.

In another example, the parts prediction model module 118 filters the claim data 111 to generate filtered data representing parts utilized in the past to repair vehicles that had damage similar that of the damaged vehicle, such as damage to similar degrees of similar areas of the damaged vehicle. Generally, the parts prediction model module 118 filters data, such as the claim data 111 and/or pre-processed parts data 114, based on any number and combination of parameters, such as vehicle type, type and extent of vehicle damage, timeframes during which damage occurred, geographic areas in which damage occurred, etc. In some embodiments of the method 300, the block 304 is omitted. In some embodiments, another part of the system 100 or the system 150 other than the parts prediction model module 118 filters the claim data 111 and/or the pre-processed parts data 114.

The method 300 includes analyzing filtered set of data to determine a set of parts that have a high likelihood of utilization in the actual repair of the damaged vehicle (block 306). For example, as previously discussed with reference to FIG. 1, to analyze the set of data, the parts prediction model module 118 may generate frequencies, counts, probabilities, etc. based on the filtered data. Additionally or alternatively, the parts prediction model module 118 may utilize pre-processed frequencies, counts, probabilities, etc. in a filtered set of the pre-processed data 114 to determine the set of parts that will most likely be used in the actual repair of the damaged vehicle. To this end, the parts prediction model module 118 may utilize one or more rule-based or probability-based functions or models generating and/or operating on frequencies, counts, probabilities, etc. to analyze the obtained and filtered data, e.g., the rule-based functions 119a and/or the probability-based functions 119b.

In an implementation, the parts prediction model module 118 analyzes a filtered set of the claim data 111 (block 306) to determine, for a vehicle similar to the damaged vehicle having damage similar to that of the damaged vehicle, a list of predicted parts that are likely to be needed in the actual repair of the vehicle. In particular, the parts prediction model module 118 may sort or determine one or more groups or combinations of parts by the frequency of an appearance or occurrence of those parts in the claim data 111 or pre-processed frequencies, counts, or probabilities corresponding to those parts (e.g., stored in the pre-processed data 114) for vehicles similar to the damaged vehicle. In an example, the parts prediction model module 118 determines that a most likely combination of parts includes a bumper, bumper bracket, and headlight cover (e.g., a combination of parts occurring fifty-two times in the claim data 111), a next most likely combination of parts includes the bumper and the bumper bracket (e.g., a combination of parts occurring twenty-seven times in the claim data 111), and a next most likely combination or parts includes the bumper, the headlight cover, and a headlight bulb (e.g., a combination of parts occurring ten times in the claim data 111), etc.

In another implementation, the parts prediction model module 118 analyzes the filtered set of claim data 111 (block 306) by counting the appearance or occurrence of pairs, groups, or other combinations of parts in a filtered set of the claim data 111 to determine conditional probabilities or distributions for each respective combination. For example, the parts prediction model module 118 may determine that, given a vehicle similar to the damaged vehicle with damage similar to that of the damaged vehicle, a first combination of parts has an 80% probability, a second combination of parts has a 61% probability, a third combination of parts has a 23% probability, etc.

Thus, the analysis of the an obtained and filtered set of data (block 306), such as the analysis of at least a portion of the claim data 111 and/or the pre-processed data 114, may result in one or more likelihoods of a part, a pair of parts, a group of parts, or any other combination of parts to be utilized in the repair of the damage vehicle. The method 300 includes generating a list of predicted parts for a claim or repair estimate (block 308), e.g., based on these likelihoods. In some implementations, the list of predicted parts includes a listing of all parts in a most likely (e.g., most frequently appearing/occurring or highest conditional probability) combination of parts. In other implementations, the list of predicted parts includes a listing of one or more parts, pairs of parts, or groups of parts, each having a corresponding likelihood. The parts prediction model module 118 may limit a number of parts on the list of predicted parts to all parts, or combinations of parts, having likelihoods at or above a certain threshold value, having costs below or above a certain threshold value, or simply numbering up to a certain pre-defined number of parts (per insurance carrier, per repair facility, etc.).

The method 300 includes providing at least a portion of the list to a remote computing device (block 310), such as to the requesting computing device 152 for its use in preparing an estimate for the repair of the vehicle. The estimate may be associated with an insurance claims, a quote from a mechanic shop, a supplement on an insurance claim, or any other process, document, or procedure in which such an estimate may be utilized.

Figure 4:
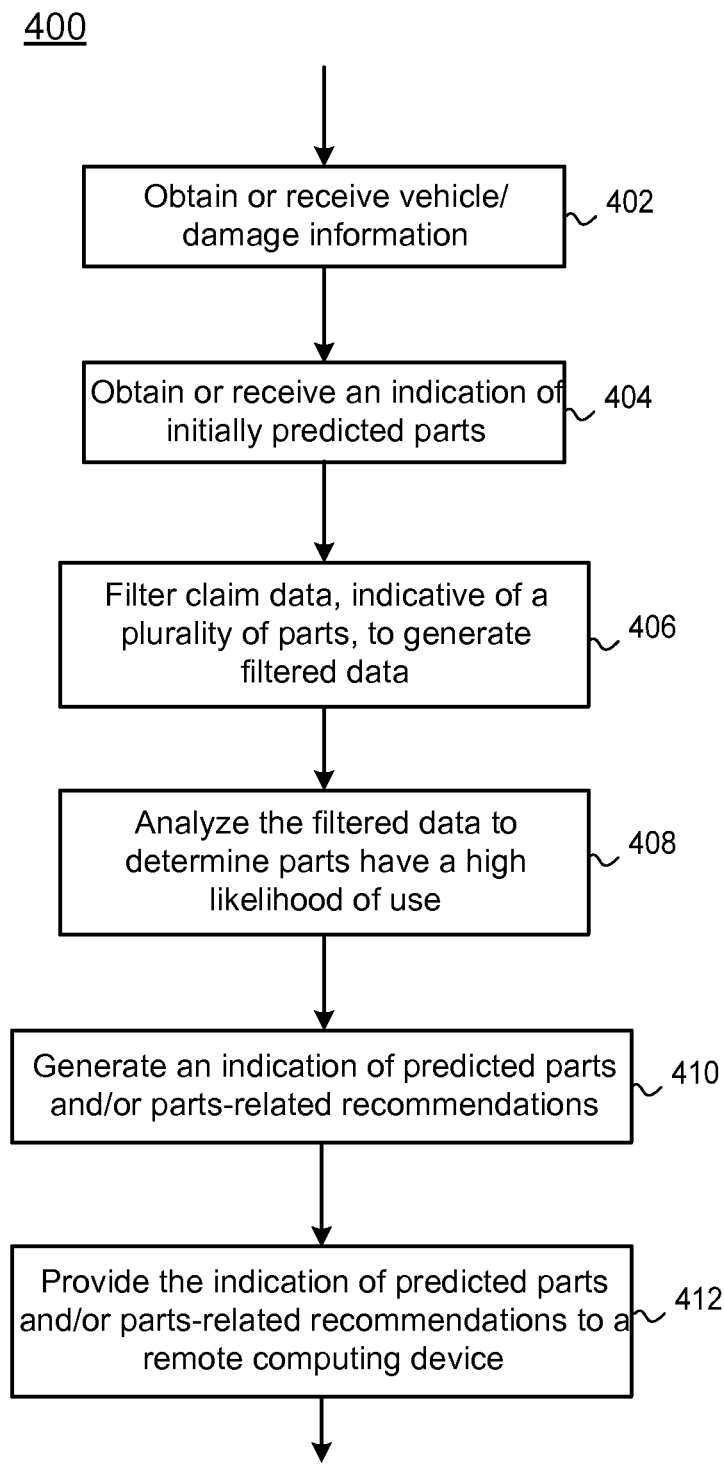
FIG. 4 is a flow diagram of an example method for predicting parts for a vehicle insurance claim which can be implemented by either one of the systems illustrated in FIGS. 1 and 2.

FIG. 4 is a flow diagram of an example method 400 for predicting parts that are needed to repair a damaged vehicle, such as in the second scenario described with reference to FIG. 1. The computer device 102 and/or the responding computing device 162 may implement at least a portion of the method 400, for example. The example method 400 is discussed below with simultaneous reference to FIGS. 1 and 2, however it is understood that other suitable computing systems may implement the example method 400.

Similar to block 302 of the method 300, at block 402, vehicle/damage information is obtained or received, e.g., by or at the responding computing device 162. However, in the example method 400, an indication of initially predicted parts may additionally or alternatively be obtained or received (block 404). For example, an insurance adjuster or mechanic may provide, prior to the initiation of execution of the method 400 (e.g., upon an inspection of the vehicle and/or upon an inspection of images of the damaged vehicle by the insurance adjuster or mechanic), an initial or approximate list of parts needed to repair a vehicle. The initial or approximate list is obtained or received (block 404), for example, at the responding computing device 162 or at the computing device 102.

The example method 400 includes filtering claim data 111 and/or the pre-processed parts data 114 (block 406) based on the information obtained at the block 402 and/or at the block 404. Filtering may include techniques to filter the claim data 111 and at least some portions of the pre-processed data 114, such as techniques similar to those discussed with reference to the example method 300. However, in some implementations, the block 406 includes a filtering of only the pre-processed parts data 114, apart from the claim data 111, to increase the efficiency of the filtering and/or of the later analysis in block 408 (e.g., to reduce a number of cycles of processors or an amount of memory utilized). As the pre-processed parts data 114 includes frequencies, counts, probabilities, etc., the filtering of the example method 400 may include a filtering of frequencies, counts, probabilities, etc. For example, the parts prediction model module 118 may filter the pre-processed parts data 114 to obtain filtered pre-processed parts data, which filtered pre-processed parts data may include a subset of probability tables corresponding to some or all of the parts included in the initial or approximate list of parts needed to repair the vehicle, a subset of frequencies or counts corresponding to combinations of parts including some or all of the parts included in the initial or approximate list of parts needed to repair the vehicle, probability tables or frequencies/counts corresponding to vehicles similar (e.g., in type) to the currently damaged vehicle, etc.

The example method 400 includes analyzing the filtered claim data 111 and/or the filtered pre-processed parts data 114 to determine one or more parts that have a high likelihood of being utilized in the actual repair of the damaged vehicle. As part of this analysis, the parts prediction model module 118 may query (e.g., via an index corresponding to a part) indexed tables in the filtered pre-processed parts data 114 corresponding to each of a plurality of parts, e.g., as previously discussed with reference to FIG. 1. In particular, the parts prediction model module 118 determines, for each part in an initial list of parts, a certain number of other parts that are likely to be combined with the respective part by querying a probability table for the respective part, which probability table includes pre-processed probability values representing conditional probabilities or distributions for a plurality of parts given that the respective part is utilized. Alternatively or additionally, the parts prediction model module 118 may, with the rule-based functions 119b, query or access the rules 115c to determine that, given the damage to the vehicle and the type of vehicle, certain parts or combinations of parts are likely to be utilized in a repair of the damaged vehicle. Generally, the parts prediction model module 118 utilizes these and/or other types of analyses, further discussed with reference to the method 300, to determine one or more parts that will likely be added to or combined with the initial list of parts for the actual repair, and/or to determine one or more certain parts on the initial list of parts that are not likely to not be used in the repair of the damaged vehicle and may be omitted from the initial list.

The method 400 may further include generating a list of predicted parts and/or parts-related recommendations, such as removing a part from a list of predicted parts and/or adding additional parts to the list of predicted parts (block 410). In an embodiment, a revised list of parts is generated by the parts prediction model module 118 which includes one or more newly determined additional parts and/or may omit one or more initial parts that are unlikely to be used. For example, the revised list of parts includes any parts having corresponding frequencies, counts, probabilities, conditional probabilities, etc. equal to or higher than a threshold value. Alternatively, the revised list of parts generated by the parts prediction model module 118 includes a certain combination of parts near maximizing a probability or conditional probability on the list of predicted parts, in an implementation. The parts prediction model 118 may also generate recommendations to remove certain parts from an initial list of parts based on low conditional probabilities, frequencies, counts, etc. of those certain parts being utilized with other highly probable parts in a repair of the damaged vehicle. Generally, any number of other parts-related recommendations may be generated in addition to or in place of the types of recommendations described above. By way of example and without limitation, lists of parts-related recommendations may also or alternatively include recommendations to replace instead of repair one or more of the parts on the list of predicted parts, recommendations to repair instead of replace one or more of the parts on the list of predicted parts, recommendations stating that the addition of another part to the list of predicted parts would result in a "total loss" (e.g., a scenario in which the damaged vehicle is not to be repaired), etc. In any event, an indication of the list of predicted parts and/or an indication of parts-related recommendations may be provided to a remote computing device (block 412).

In some implementations, methods to predict parts utilized in the repair of a damaged vehicle (e.g., the method 300 and/or the method 400) operates in conjunction with a model to predict whether an insurance claim will have a supplement. That is, a method, such as the example method 400, may operate when a separate model to predict a supplement predicts that a supplement to an insurance claim on the damaged vehicle is likely (e.g., a probability of the supplement is equal to or above a threshold value). In this manner, the example method 400 predicts a list of parts that is likely to be included on the predicted supplement. The model utilized to predict the supplement may operate as described in U.S. patent application Ser. No. 14/168,345, entitled "SYSTEM AND METHOD OF PREDICTING A VEHICLE CLAIM SUPPLEMENT BETWEEN AN INSURANCE CARRIER AND A REPAIR FACILITY."

Figure 5:
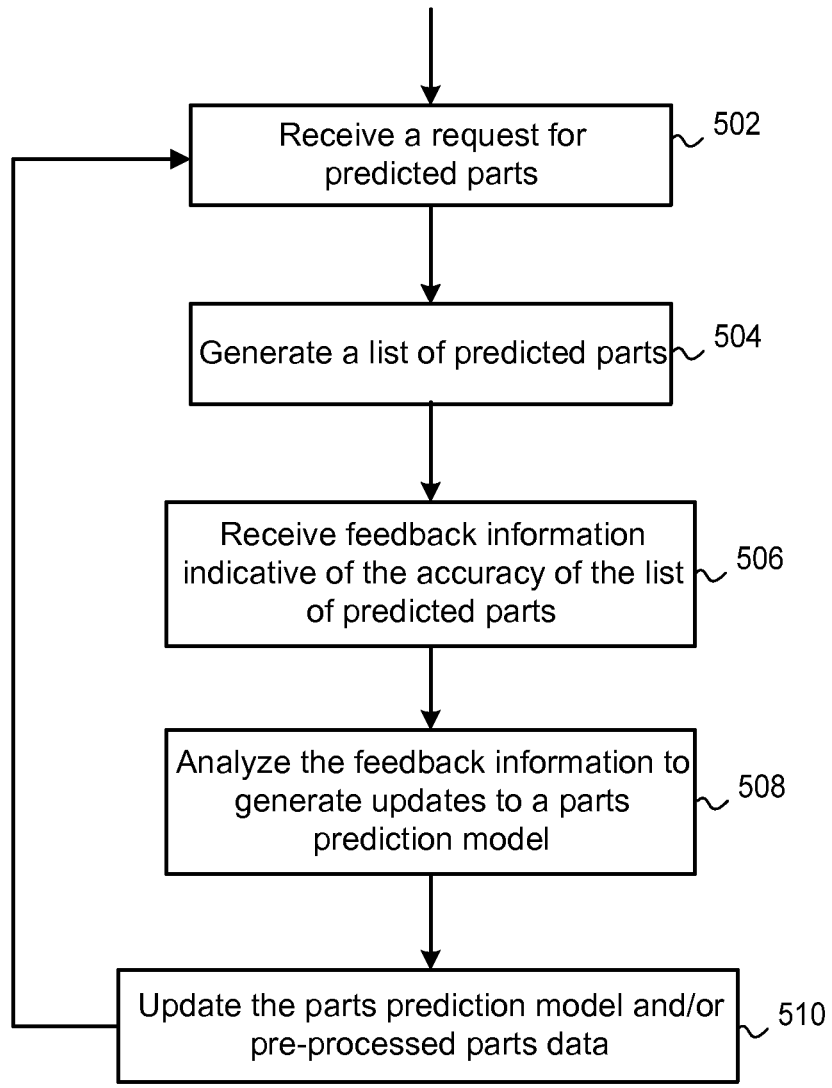
FIG. 5 is a flow diagram of an example method for modifying or updating a parts prediction model and/or pre-processed parts data based on feedback information which can be implemented by either one of the systems illustrated in FIGS. 1 and 2.

Some implementations of parts prediction models may be updated or modified over time based on feedback information. FIG. 5 is a flow diagram of an example method for updating or modifying a parts prediction model over time based on feedback information. The computing device 102 and/or the responding computing device 162 may implement at least a portion of the method 500, for example. In some embodiments, the method 500 may be executed after one or more executions of the method 300 and/or of the method 400.

The example method 500 includes receiving or obtaining a request for a list of predicted parts and/or parts-related recommendations (block 502), e.g., at the responding computing device 152. Additionally, the example method 500 includes generating, based on the received request, the list of predicted parts, e.g., by utilizing a parts prediction model (block 504). In some cases, a list of predicted parts may be generated by the parts prediction model module 118 which implements the example method 300 and/or the example method 400. After generating the list of predicted parts, the example method 500 includes receiving feedback information, wherein the feedback information includes one or more indications of one or more accuracies corresponding to the generated list of predicted parts (block 506). The feedback information may include, as previously described with reference to FIG. 1, an actual list of parts utilized in the actual repair of the damaged vehicle, actual costs associated with the actual repair of the damaged vehicle, etc. This feedback information may be received from remote computing device, such as devices operated by insurance adjusters, claim handlers, mechanics, repair shops, etc., and may be received after the repairs have been completed and the claim has been settled.

Upon receiving the feedback information, the example method 500 includes analyzing feedback information with reference to the previously generated predicted list of parts (e.g., generated with respect to the block 504) to generate one or more updates to the parts prediction model module 118 and/or to the pre-processed parts data 114 (block 508). Such analysis or analyses include, for example, determining parts that were predicted to be used but were not actually used in the actual repair of the damaged vehicle, determining parts that were not predicted to be used but were actually used in the actual repair of the damaged vehicle, determining a difference of a cost associated with the predicted list of parts and an actual cost charged by a repair facility, etc. For example, a parts prediction model module 118 may have predicted that parts A, B, and C will be utilized in the repair of a vehicle, and an actual repair of the vehicle may have actually utilized parts A, B, C, and D. In such a case, the prediction model update/generation module 116 may increase a probability of part D in the pre-processed tables corresponding to parts A, B, and C (e.g., as stored in the pre-processed parts data 114). In another example, a parts prediction model 118 may have predicted that parts A, B, and C will be utilized in the repair of a vehicle, and an actual repair of the vehicle may have actually utilized parts C, D, and E. In such a case, the prediction model update/generation module 116 may increase a probability of parts D and E in a pre-processed table corresponding to part C (e.g., as stored in the pre-processed parts data 114), and may also decrease a probability of parts A and B in the pre-processed table 115a.

Generally, a prediction model update/generation module 116 may generate any number and combination of modifications or updates to pre-processed parts data 114 and/or to a parts prediction model 118 utilizing the pre-processed parts data 114. A prediction model update/generation module 116 may modify rules utilized by rule-based 119a or probability-based functions 119b of a parts prediction model module 118, and/or may update/modify frequencies, counts, probabilities, conditional probabilities, distributions, indices, etc. in pre-processed parts data 114. Once generated, the one or more updates or modifications may be applied to the parts prediction model module 118 and/or to the pre-processed parts data 114 (block 510). This application of the one or more updates and/or modifications includes, by way of example, replacing code, modifying database entries, deleting database entries, adding database entries, modifying stored parameters utilized by the parts prediction model 118, etc.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. It is also recognized that the specific approaches described herein represent but some of many possible embodiments as described above. Consequently, the claims are properly construed to embrace all modifications, variations and improvements that fall within the true spirit and scope of the invention, as well as substantial equivalents thereof. Accordingly, other embodiments of the invention, although not described particularly herein, are nonetheless considered to be within the scope of the invention.

What is claimed is:

1. A system comprising:
a network interface;
one or more data storage devices storing data indicative of a plurality of parts that were utilized to repair a plurality of vehicles, the data indicative of the plurality of parts that were utilized to repair the plurality of vehicles being vehicle parts data, and the vehicle parts data being accessible to a parts prediction model module via the network interface; and
the parts prediction model module comprising a set of computer-executable instructions stored on one or more memories, and the set of computer-executable instructions, when executed by one or more processors, cause the system to:
based on information obtained via the network interface and indicative of damage to a specific vehicle, filter the vehicle parts data to obtain filtered vehicle parts data indicative of a subset of the plurality of parts that were utilized to repair a subset of the plurality of vehicles, wherein at least one of: (i) a type of at least some members of the subset of the plurality of vehicles is a type of the specific vehicle, or (ii) at least some of the damage to the specific vehicle is equivalent to respective damage of at least some of the members of the subset of the plurality of vehicles prior to repair;
obtain an indication of at least one specific part determined as being needed to repair the damage to the specific vehicle;
analyze, based on the indication of the at least one specific part, the filtered vehicle parts data to determine one or more recommended parts, each of the one or more recommended parts having a respective, higher likelihood of utilization in repairing the specific vehicle than a respective likelihood of utilization in repairing the specific vehicle of at least one other part included in the subset of the plurality of parts and excluded from the one or more recommended parts; and
cause an indication of the one or more recommended parts to be transmitted to at least one of: a remote computing device via the network interface or a user interface.

2. The system of claim 1, wherein at least a portion of the vehicle parts data is indicative of, for each of one or more groupings of parts included in the plurality of parts, a frequency of occurrence of each grouping in historical insurance claim data.

3. The system of claim 2, wherein the analysis of the filtered vehicle parts data to determine the one or more recommended parts includes executing one or more rule-based functions specially configured to determine the one or more recommended parts based on the frequencies of occurrence of the one or more groupings.

4. The system of claim 2, wherein:
the filtering of the vehicle parts data includes a filtering of the frequencies of occurrence of the one or more groupings to obtain a subset of the frequencies of occurrence, and
each frequency of occurrence included in the subset of the frequencies of occurrence corresponds to a respective grouping in which the at least one specific part is included.

5. The system of claim 2, wherein the historical insurance claim data is included in the vehicle parts data.

6. The system of claim 1, wherein:
at least a portion of the vehicle parts data is indicative of, for each of one or more groupings of parts included in the plurality of parts, a respective distribution; and
the respective distribution is based on a count of a number of occurrences of the each of the one or more groupings in historical insurance claim data.

7. The system of claim 1, wherein:
at least a portion of the vehicle parts data is indicative of, for each of one or more groupings of parts included in the plurality of parts, a respective probability; and
the respective probability is based on a count of the each of the one or more groupings occurring in historical insurance claim data.

8. The system of claim 7, wherein the analysis of the filtered vehicle parts data to determine the one or more recommended parts includes executing one or more probability-based functions specially configured to determine the one or more recommended parts based on the respective probabilities of a subset of the one or more groupings in which the at least one specific part is included.

9. The system of claim 7, wherein at least one of the respective probabilities is a conditional probability corresponding to a respective one of the one or more groupings.

10. The system of claim 9, wherein the conditional probability corresponds to the respective one of the one or more groupings and at least one other parameter, the at least one other parameter being indicative of at least one of: a vehicle type, another characteristic of the vehicle, a location of a damage point on the vehicle, a degree of damage of the damage point, or a level of desired target quality of repair.

11. The system of claim 1, wherein the information indicative of the damage to the specific vehicle is obtained via the network interface from the remote computing device.

12. The system of claim 11, wherein the information indicative of the damage to the specific vehicle is obtained via the network interface from the remote computing device at a First Notice of Loss (FNOL).

13. The system of claim 1, wherein the indication of the at least one specific part is obtained via the network interface from the remote computing device.

14. The system of claim 1, wherein the information indicative of the damage to the specific vehicle includes at least two of: the type of the specific vehicle; one or more damage points associated with one or more locations, on the specific vehicle, of the damage to the specific vehicle; an indication of whether the specific vehicle is drivable; or an indication of whether or not an airbag of the specific vehicle was deployed.

15. The system of claim 14, wherein the information indicative of the damage to the specific vehicle utilized in the filtering of the vehicle parts data includes at least three of: the type of the specific vehicle; the one or more damage points associated with the one or more locations, on the specific vehicle, of the damage to the specific vehicle; the indication of whether the specific vehicle is drivable; or the indication of whether or not the airbag of the specific vehicle was deployed.

16. The system of claim 1, wherein the analysis of the filtered vehicle parts data to determine the one or more recommended parts includes:
  an access to a table included in the filtered vehicle parts data, wherein the table corresponds to the at least one specific part, and wherein each of a plurality of entries in the table indicates a respective frequency or a respective probability corresponding to a respective other part included in the subset of the plurality of parts; and
  a selection of the one or more recommended parts from the subset of the plurality parts based on the respective frequencies or the respective probabilities included in the table.

17. The system of claim 16, wherein the analysis of the filtered vehicle parts data to determine the one or more recommended parts further includes an identification of all respective frequencies or all respective probabilities that are included in the table and that are above a threshold value; and wherein the selection of the number of parts from the subset of the plurality parts is based on the identification.

18. The system of claim 16, wherein the respective frequencies or the respective probabilities are sorted respective frequencies or sorted respective probabilities, and wherein the selection of the number of parts from the subset of the plurality parts is based on a highest pre-defined number of the sorted respective frequencies or the sorted respective probabilities.

19. A computer device comprising:
  one or more communication interfaces;
  an access mechanism to data indicative of a plurality of parts that were utilized to repair a plurality of vehicles, the data indicative of the plurality of parts that were utilized to repair the plurality of vehicles being vehicle parts data;
  one or more processors; and
  one or more non-transitory memories coupled to the one or more processors,
  wherein the one or more non-transitory memories include computer executable instructions stored therein that specially configure the one or more processors such that, when executed by the one or more processors, the computer executable instructions cause the computer device to:
    (a) obtain information indicative of damage to a specific vehicle,
    (b) access the vehicle parts data using the access mechanism,
    (c) based on the information indicative of the damage to the specific vehicle, filter the accessed vehicle parts data to obtain filtered vehicle parts data indicative of a subset of the plurality of parts that were utilized to repair a subset of the plurality of vehicles, wherein at least one of: (i) a type of at least some members of the subset of the plurality of vehicles is a type of the specific vehicle, or (ii) at least some of the damage to the specific vehicle is equivalent to respective damage of at least some of the members of the subset of the plurality of vehicles prior to repair,
    (d) analyze the filtered vehicle parts data to determine, for each member of the subset of the plurality of parts, a likelihood that the each member will be utilized in repairing the damage to the specific vehicle,
    (e) generate a list of parts based on the likelihoods determined by analyzing the filtered vehicle parts data, and
    (f) cause the list of parts to be at least one of transmitted from the computing device using the one or more communication interfaces or displayed at a user interface.

20. The computer device of claim 19, wherein:
  the specific vehicle is covered by an insurance policy provided by an insurance carrier;
  the damage to the specific vehicle corresponds to a specific insurance claim on the insurance policy; and
  the computer executable instructions further cause the computer device to:
    (g) prior to executing (c) and (d), obtain a supplement likelihood, wherein the supplement likelihood is a measure of how likely the insurance claim is to include a supplement, and wherein the supplement likelihood is determined by a supplement model specially configured to determine the supplement likelihood, and
    (h) determine that the supplement likelihood is equal to or above a threshold value; and
  the computer executable instructions cause the computer device to perform (e) and (f) upon determining that the supplement likelihood is equal to or above the threshold value.

21. The computer device of claim 19, wherein (d) and (e) are performed using a module specially configured to predict the list of parts based on the information indicative of the damage to the specific vehicle and the vehicle parts data; and wherein the computer executable instructions further cause the computer device to:
  (j) receive feedback information indicative of a level of accuracy of the generated list of parts, and
  (k) modify the module based on the feedback information such that the modified module is utilized to generate subsequent lists of parts.

22. The computer device of claim 21, wherein the feedback information includes a list of parts that were actually utilized in repairing the damage to the specific vehicle.

23. A computer readable storage medium comprising non-transitory computer readable instructions stored thereon that specially configure one or more processors of a computing device such that, when executed by the one or more processors, the computer readable instructions cause the computing device to:
  obtain information indicative of damage to a specific vehicle;
  access the vehicle parts data using the access mechanism;
  based on the information indicative of the damage to the specific vehicle, filter the accessed vehicle parts data to obtain filtered vehicle parts data indicative of a subset of the plurality of parts that were utilized to repair a subset of the plurality of vehicles, wherein at least one of: (i) a type of at least some members of the subset of the plurality of vehicles is a type of the specific vehicle, or (ii) at least some of the damage to the specific vehicle is equivalent to respective damage of at least some of the members of the subset of the plurality of vehicles prior to repair;
  analyze the filtered vehicle parts data to determine, for each member of the subset of the plurality of parts, a likelihood that the each member will be utilized in repairing the damage to the specific vehicle;
  generate a list of parts based on the likelihoods determined by analyzing the filtered vehicle parts data; and cause the list of parts to be at least one of transmitted from the computing device using the one or more communication interfaces or displayed at a user interface.

\* \* \* \* \*